US008254863B2

(12) United States Patent
Strandberg et al.

(10) Patent No.: US 8,254,863 B2
(45) Date of Patent: Aug. 28, 2012

(54) BROADCAST RECEIVER AND METHOD FOR SETTING BROADCAST RECEIVERS

(75) Inventors: Stefan Strandberg, Vörå (FI); Johan Sjöblom, Vörå (FI)

(73) Assignee: Manor Research, L.L.C., Dover, DE (US)

( * ) Notice: Subject to any disclaimer, the term of this patent is extended or adjusted under 35 U.S.C. 154(b) by 1914 days.

(21) Appl. No.: 10/509,376

(22) PCT Filed: Mar. 27, 2003

(86) PCT No.: PCT/FI03/00237
§ 371 (c)(1),
(2), (4) Date: Sep. 28, 2004

(87) PCT Pub. No.: WO03/084098
PCT Pub. Date: Oct. 9, 2003

(65) Prior Publication Data
US 2005/0170799 A1    Aug. 4, 2005

(30) Foreign Application Priority Data

Mar. 28, 2002    (FI) ..................................... 20020613

(51) Int. Cl.
*H04B 1/18*    (2006.01)
(52) U.S. Cl. ............... 455/179.1; 455/180.1; 455/185.1; 455/186.1; 455/3.02
(58) Field of Classification Search ............... 455/186.1, 455/3.01, 3.02, 3.06, 414.1–414.3, 142, 344, 455/188.1, 553.1, 552.1, 550.1, 403, 500, 455/517, 466, 73–74, 556.1, 185.1, 180.1, 455/184.1, 158.4, 426.1, 427, 12.1, 557, 455/130, 179.1; 348/E7.071; 709/217, 231, 709/223, 219, 232
See application file for complete search history.

(56) References Cited

FOREIGN PATENT DOCUMENTS

| | | |
|---|---|---|
| EP | 0 848 553 A2 | 6/1998 |
| EP | 1 187 474 A2 | 3/2002 |
| EP | 1 191 722 A2 | 3/2002 |
| WO | 03084098 | 9/2003 |

OTHER PUBLICATIONS

European Office action for corresponding EP app. No. 03 712 172. 0-2411 dated Aug. 2, 2010, pp. 1-4.
Swedish Patent Office, International Search Report PCT/FI03/00237; Jun. 5, 2003; 2 pages.

*Primary Examiner* — Pablo Tran
(74) *Attorney, Agent, or Firm* — Stolowitz Ford Cowger LLP

(57) ABSTRACT

A broadcast receiver and a method for setting the broadcast receiver, comprising receiving a primary broadcast sent by a broadcast station and retrieving program associated data made available by said broadcast station. The method comprises a first channel, a primary broadcast channel BC, and a second channel, an interaction channel, for retrieving the program associated data (PAD) from the broadcast station, whereby a browser sends an HTTP or a WAP request using an Internet connection. The method comprises retrieving a uniform resource locator of the program associated data (PAD) as station associated data (SAD) from a station associated data site (SADS) the station associated data comprising program associated data relating to the primary broadcast, coverage information and frequency information of included broadcast stations and the broadcast receiver being capable of setting the browser and the broadcast receiver unit by suing this SAD information.

22 Claims, 5 Drawing Sheets

BROADCAST RECEIVER AND METHOD FOR SETTING BROADCAST RECEIVERS

BACKGROUND OF THE INVENTION

The invention relates to broadcast receivers, methods and equipment for setting broadcast receivers.

Mobile telephones are now coming equipped with broadcast receivers, such as FM receiver chips, to allow the user to listen to FM radio broadcasts when not using the telephone for voice calls. These mobile telephones are often also equipped with an Internet connection device, such as a data modem, to be used for an Internet access, and with hypertext retrieval protocols, such as WAP (Wireless Application Protocol), HTTP (HyperText Transfer Protocol), and a browser capable of decoding, presenting, and navigating hypertext, such as HTML (HyperText Markup Language) or WML (Wireless Markup Language) or the like.

Many broadcast stations, such as radio stations, have started to offer PAD (Program Associated Data) corresponding to the program offered on a primary BC (broadcast channel). This data can be retrieved from Internet sites with a browser. URL (Uniform Resource Locator) identifies a site and the URL is typically stored as a bookmark in the broadcast receiver.

Existing mobile phone/FM receiver combinations rely on the user finding a station, then saving and labelling the frequency. On some older telephones, the radio is an add-on option, and the frequency selector is not integrated with the telephone system at all.

When using an analogue AM/FM transmission, it is desirable to choose the best frequency for a particular broadcast available in the area in question. Radio stations use different frequencies for the same broadcasts in different locations. It may be possible to store the frequency of a certain radio program, but problems arise when the user moves to a different location where the radio stations and frequencies are different from those that are stored.

DISCLOSURE OF THE INVENTION

An object of the invention is to offer a solution for connecting a primary broadcast received by a user's broadcast receiver on a primary broadcast channel with an URL (Uniform Resource Locator) where corresponding PAD (Program Associated Data) are offered, or vice versa, i.e. the user is connected with an URL that provides program associated data with information on a primary BC (Broadcast Channel) associated with the user's broadcast receiver. This object is achieved by a method and equipment having the characteristics defined in the independent claims. Preferred embodiments of the invention are disclosed in the attached dependent claims.

The invention comprises associating the frequency of a broadcast receiver unit, such as an FM receiver chip, with an URL containing PAD. PAD is offered using an SAD (Station Associated Data) site by simply browsing a web server herein referred to as SADS (Station Associated Data Site).

SAD are retrieved using an interaction channel. The retrieving is done with a request sent by a browser utilizing an IP (Internet Protocol) connection to retrieve hypertext. The hypertext used by the browser is for example HTML or WML. The protocol used for retrieving hypertext request used by the Internet connection device, such as a data modem, is for example an HTTP (HyperText Transfer Protocol) request or a WAP (Wireless Application Protocol) request.

The interaction channel comprises a return interaction path and a forward interaction path and this allows station associated data to be retrieved.

The connection could also be a dial-in connection, or the interaction channel may be replaced with an SMS (Short Message) arrangement. When using SMS the broadcast receiver must have means for identifying the SAD information included in the SMS and for making the broadcast receiver settings.

A broadcast station sends a primary broadcast using a primary broadcast channel that has a certain frequency or channel signature.

SADS contains a listing of different SAD elements. The SADS comprises a complete SAD listing. One SAD element constitutes an information package about a program channel including information such as the URL of the associated PAD. Position information describing the coverage area of the broadcast station is also included in SAD. The SAD should also include other information, such as frequency information, a possible channel signature and a frequency coding type.

The listing depends on the position of the broadcast receiver, the indicated frequency, or the channel signature in the broadcast receiver.

The user of the broadcast receiver is thus capable of selecting a SAD from this listing. The selection is performed as a single selection or click by utilizing a utility control interface set in the integrated broadcast receiver unit, such as a radio chip, and the browser.

The Finnish broadcasting corporation YLE has radio stations which in turn have many different PAD sites and therefore it is possible for YLE to have one or more common SADS.

To receive the correct SAD listing, items that have an effect on the SAD listing should be included in the request. The request sent by the browser to SADS comprises precognition about the broadcast receiver. At first the broadcast receiver should tell the device type that can receive the primary broadcast. The type of the device unit or chip may be AM, FM, RDS, digital radio, television or any other device capable of receiving a primary broadcast.

The request should include position information describing the location of the device. The device's position can be determined using a mobile network, or a GPS (Global Positioning System) device can be integrated in the broadcast receiver. The position information can be approximate so that cell-based positioning being adequate in most cases and the device can determine its own position. Moreover, the SAD listing may include current operational information, such as the frequency or the channel signatures of the broadcast receiver. If it is possible to determine the identity of the user, for example the user's IMSI (International Mobile Subscriber Identity), then such identity information can also be included in the request. Other items, such as the currently used menu language, may affect list filtering. Also, if the situation the user is in, for example a sport event or a concert, can be determined, it can be included in request.

The request can be regenerated when needed by a trigger arranged in the broadcast receiver. The trigger can be arranged for example in a broadcast receiver unit monitoring the primary broadcast level or in a utility control monitoring the position of the broadcast receiver. Regenerating the request is needed for example when the position of the broadcast receiver changes and the quality of the primary broadcast decreases. In some cases it is preferred that the regenerating is approved by the user before it is executed.

A single user selection or click on an URL link in SAD or in a bookmark stored in the broadcast receiver sets the broadcast receiver unit to receive the correct frequency according to given perquisite information, such as position information and guides the browser forward to the associated broadcast station site with using SADS containing PAD information for enjoyment.

BRIEF DESCRIPTION OF THE DRAWINGS

The invention will be described in more detail by means of preferred embodiments with reference to the appended drawings wherein.

DETAILED DESCRIPTION OF THE INVENTION

Figure 1:
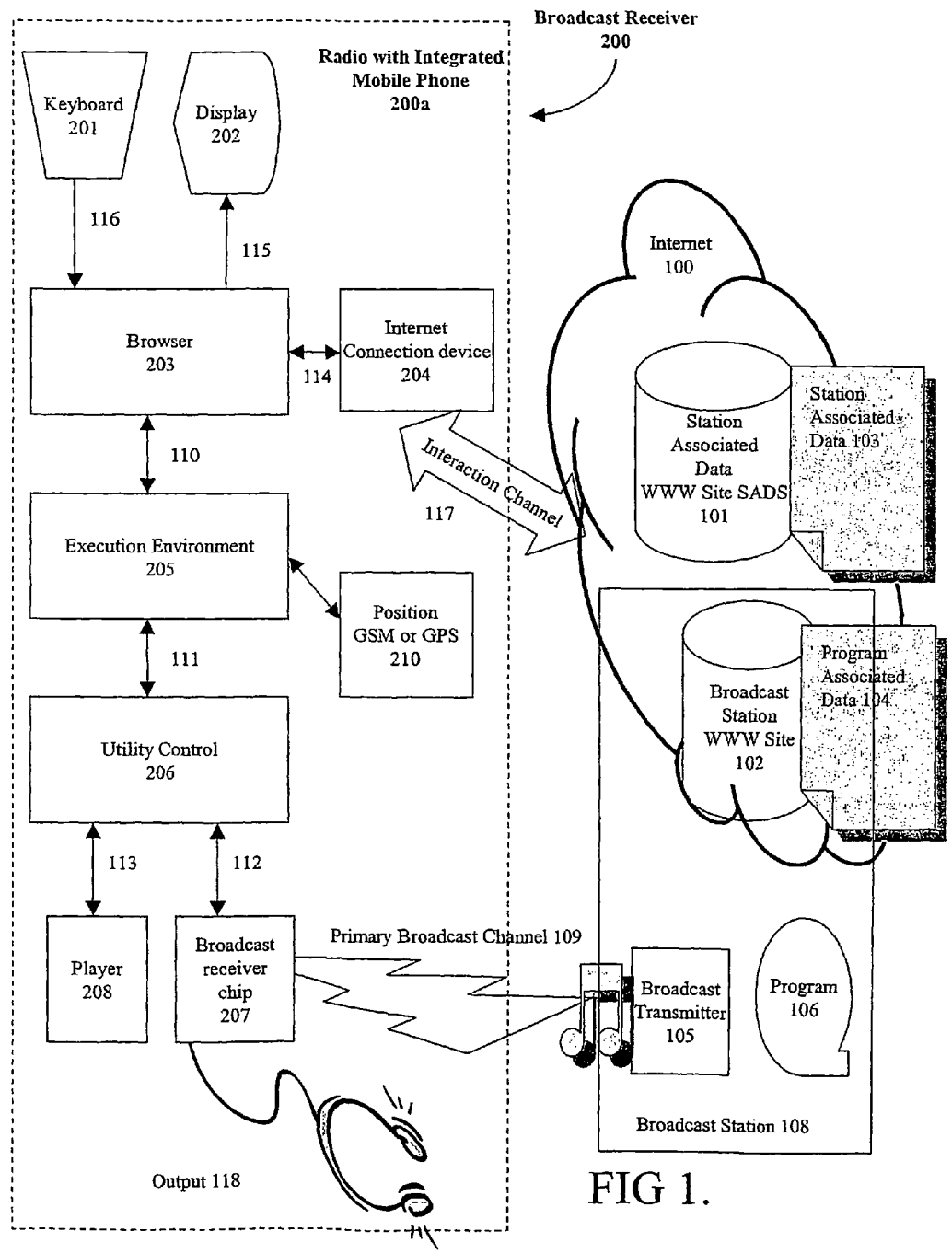
FIG. 1 illustrates a concept of making the settings of a broadcast receiver having an integrated mobile phone using two different channels, an interaction channel and a primary broadcast channel.

FIGS. 1-6 illustrate the concept of making the settings of a broadcast receiver 200 having an integrated mobile phone 200a by using two different channels, an interaction channel and a primary broadcast channel. In FIG. 1 a browser 203 is connected to a broadcast receiver unit 207, such as radio chip, to enable the browser to perform controlling functions, such as tuning of the broadcast receiver unit to a frequency according to the information retrieved from the Internet 100 over an interaction channel 117. It is possible for a web site having a database to contain SAD 103, such as the frequency information and other control data used for setting the broadcast receiver unit 207 to associate with broadcast stations. This frequency information and other SAD 103 are retrieved by the browser from SADS 101 and then supplied to the broadcast receiver unit 207 through an execution environment 205 and a utility control interface 206.

If the utility control interface 206 is a standard web server, implementing at least parts of the HTTP protocol, for example GET and HEAD functions, the execution environment is not needed. In that case the browser is capable of using the utility control interface 206 as a local web server and the control data needed to set the frequency of the broadcast receiver unit, such as a radio chip, would simply include an URL link where the frequency information and other SAD data are carried as parameters. One of the connections between browser 203, execution environment 205, utility control 206 and broadcast receiver unit 207 is a short-range radio connection, such as a bluetooth connection. The connection may also be a cable connection or an infrared connection. This allows separate devices to be used.

In addition to containing SAD, such as the receiver frequency, SADS 101 may also contain within the same data a forwarding URL link to a radio station web site 102, where PAD 104 is being presented for that frequency broadcast.

After tuning the broadcast receiver unit 207, the browser is forwarded either by the execution environment 205 or the utility control interface 206 to the broadcast station site 102, where the browser retrieves a markup language, i.e. the PAD presented on that site 102.

Examples of PAD includes the song and artist currently on air, DJ e-mail contact forms, local entertainment events, local news and weather reports, etc. Station call-in telephone numbers could be linked to the mobile phone via so called WTAI (Wireless Telephony Application Interface) links that execute functions built into WAP phones, such as automatical dialling at the phone for a voice call when you click on the WTAI link in the browser. This broadcast station phone number information can be considered either as SAD or PAD.

Since all the entire SAD 103 for a certain broadcast station may be a single URL link, the SAD site 101 simply contains a collection of links that are retrieved to the display 202 by the browser 203 as choices for the end user. When the end user makes a selection, the browser sends an HTTP retrieval command, such as GET, to the utility control 206. This command includes SAD, such as the URL link to the broadcast station web site 102 as well as the frequency that the broadcast receiver unit 207 is set to receive on the primary broadcast channel 109. After setting the broadcast receiver unit frequency, the browser is forwarded by the utility control 206 to the broadcast station web site 102. At that site PAD is presented in a hypertext format, such as HTML or WML. Thus, as a result of choosing a certain broadcast station link on the SAD site, the broadcast receiver unit starts receiving the frequency of the station and the browser shows the PAD retrieved from that same station, all with a single click.

In order for the SAD site 101 to provide the broadcast receiver unit 207 with the correct SAD, such as the frequency and the URL link from where the browser should retrieve PAD, the SAD site can use the position knowledge of the broadcast receiver 200 having the integrated mobile phone 200a. The SAD site service can obtain this position knowledge by sending the mobile network a request that includes the identifier of the mobile phone, or it may have received the position in the initial HTTP request from the mobile phone. The latter is possible if the mobile phone can position itself either by using the mobile network or a GPS device integrated in the mobile phone 200a. It is thus possible for broadcast stations, such as radio stations that broadcast on different frequencies in different positions to have the broadcast receiver unit provided with the correct frequency setting for it current position by comparing the position information of the broadcast receiver with the coverage area information relating to the included broadcast stations. Filtered SAD is then presented to the user. Comparison of the position information or other precognition information, such as the broadcast receiver device type, indicated frequency and/or channel signatures of the broadcast receiver, or a local uniform resource locator link selected on the browser of the broadcast receiver is executed at a web server, such as SADS, or it may be performed at the broadcast receiver. When performed at the broadcast receiver a complete SAD listing is returned from SADS to the broadcast receiver and data comparison and filtering are executed at the broadcast receiver.

Further, in order for the SAD site 101 to return the correct SAD to the broadcast receiver unit 207, the SAD site can use partial SAD data, such as a channel signature and/or a selected frequency, that can be sent from the broadcast receiver to the SAD site in the initial HTTP request. This channel identifier may be extracted from the broadcast receiver unit 207 in the following way. The URL link to the SAD site does not refer directly to the SAD site, instead the SAD site is only a parameter in an URL link referring to web server interface of the local utility control 206. The utility control 206 receives the HTTP GET command and reads the actually chosen SAD, such as frequency, channel signatures and possibly associated PAD URL link, from the broadcast receiver unit 207. The browser 203 is instructed to proceed to the SAD site, and the partial SAD data retrieved from the broadcast receiver unit are sent as HTTP parameters forwarded by the browser.

Further, the SAD site can also return a listing of SAD where each listed SAD item is a link which if selected, sets the broadcast receiver unit settings to a certain station using either the broadcast receiver unit frequency or the station signature or both. At the same time the browser is directed to the associated PAD site 102.

Further, the SAD site listing may be based on that the user selects the type of music he is interested in: rock, contemporary, jazz, etc. The listings returned from the SAD site can be categorized according to such user choices.

Finally all the SAD for a particular radio station can be conveniently stored in the execution environment 205, in the utility control 206, or in the broadcast receiver unit 207 as a bookmark. When the user selects a broadcast station, the associated URL of the PAD site 102 is suggested to the browser 203. If the URL linking to the PAD site 102 is selected at the browser the user may be prompted to set the frequency according to the SAD stored as a bookmark.

Figure 2:
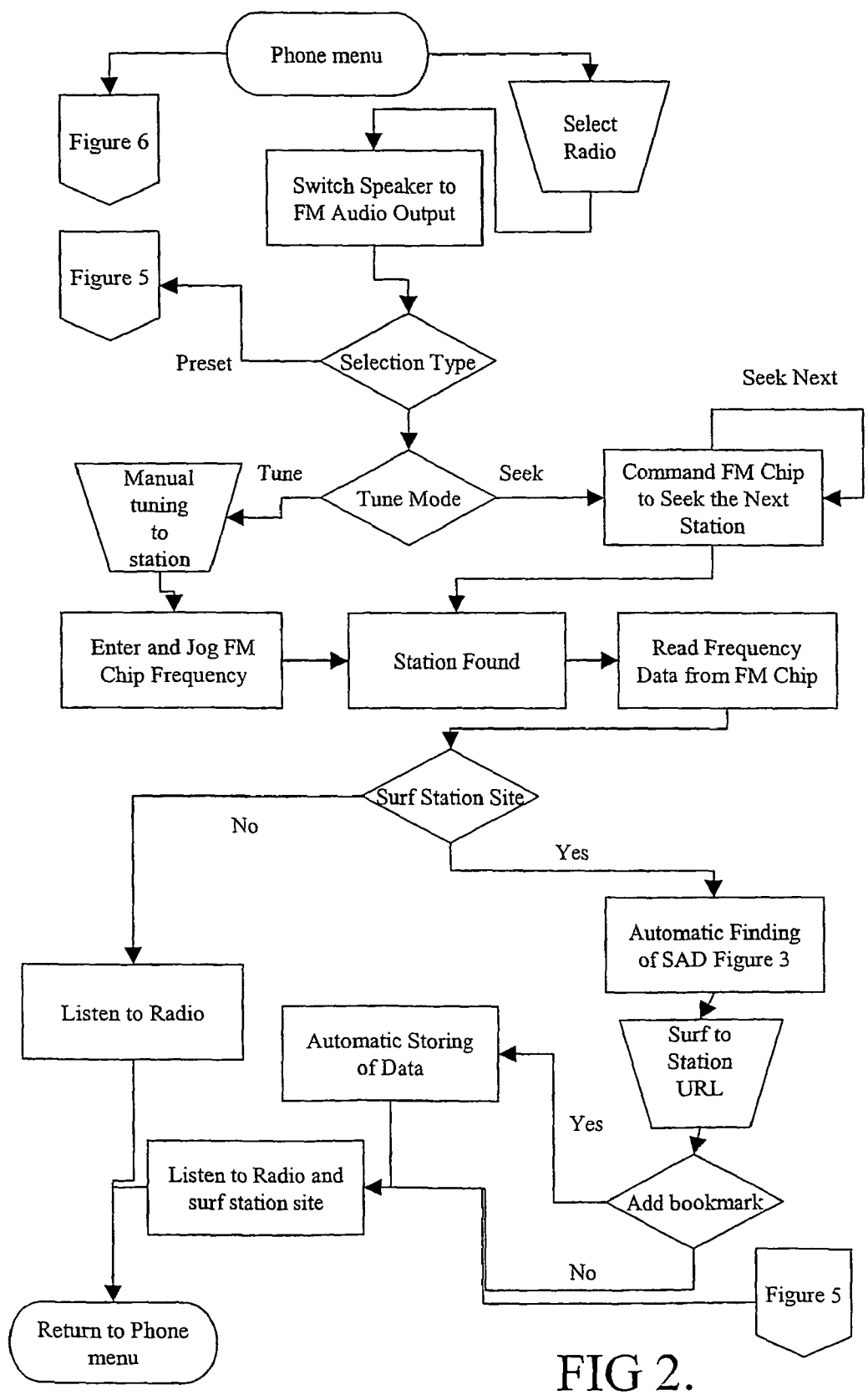
FIG. 2 is a flow chart illustrating a method for making the settings of a broadcast receiver in a concept as shown in FIG. 1.

FIG. 2 is a flow chart illustrating a method for making broadcast receiver settings according to the concept shown in FIG. 1. FIG. 2 shows one embodiment where a broadcast station is found and frequency data are read from an FM chip. The embodiment relates to a situation where the user decides to surf the station site. Then automatic finding of SAD (shown in FIG. 3) is executed and an URL linking to the PAD site is received. The PAD site can be bookmarked at this point, before listening to the radio and simultaneously the surfing station site.

Figure 3:
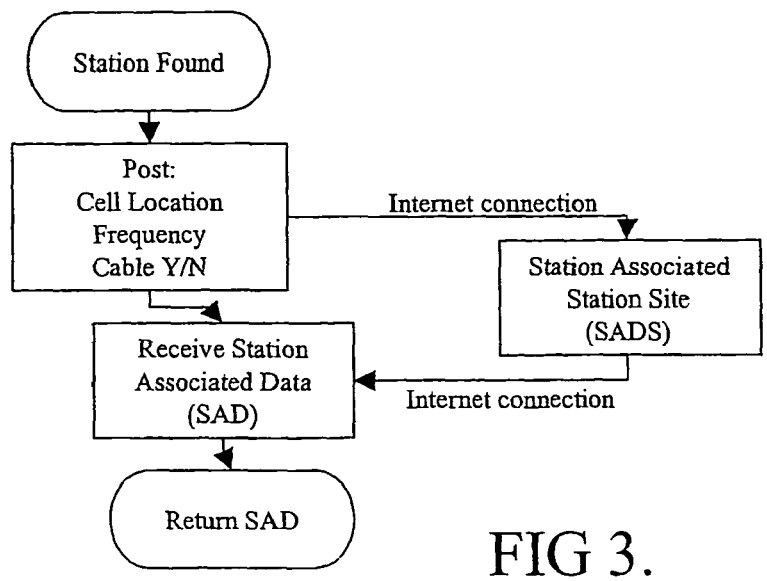
FIG. 3 is a flow chart illustrating a method for sending a request to SADS (Station Associated Data Site) and for retrieving SAD (Station associated Data) by using an Internet connection.

FIG. 3 is a flow chart illustrating a method for posting request to SADS and retrieving SAD by using an Internet connection. FIG. 3 shows an embodiment where an SAD request is sent to SADS over the Internet connection, using in the request precognition information about broadcast receiver, such as position information determined with mobile positioning (cell location). Precognition information may also include a currently used frequency or a device type, such as the connection type (Cable Y/N) of said broadcast receiver.

This precognition information contained in the request about the broadcast receiver is compared and filtered by database managing means for maintaining station associated data 103, the station associated data comprises program associated data 104 relating to a primary broadcast and made available on the web as the referenced uniform resource locator of said program associated data 104, frequency information relating to a primary broadcast and coverage area information relating to included broadcast stations. This filtered listing of SAD is returned to the broadcast receiver (200) as shown in FIG. 4.

Figure 4:
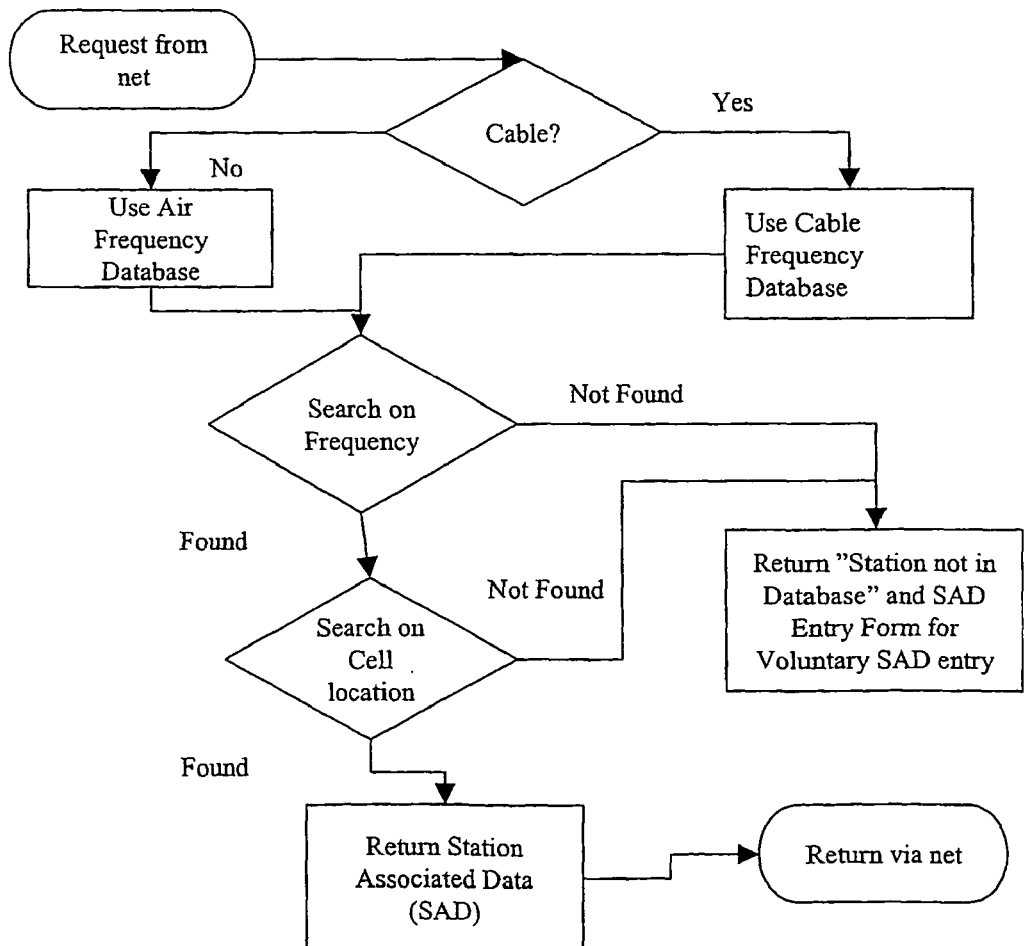
FIG. 4 is a flow chart illustrating the processing of a received request at SADS.

FIG. 4 is a flow chart illustrating the processing of a received request at SADS. It shows the comparison and filtering of the precognition information included in the request about the broadcast receiver and broadcast station information in a database. In this embodiment the comparison and the filtering are carried out using frequency information and cell location.

Figure 5:
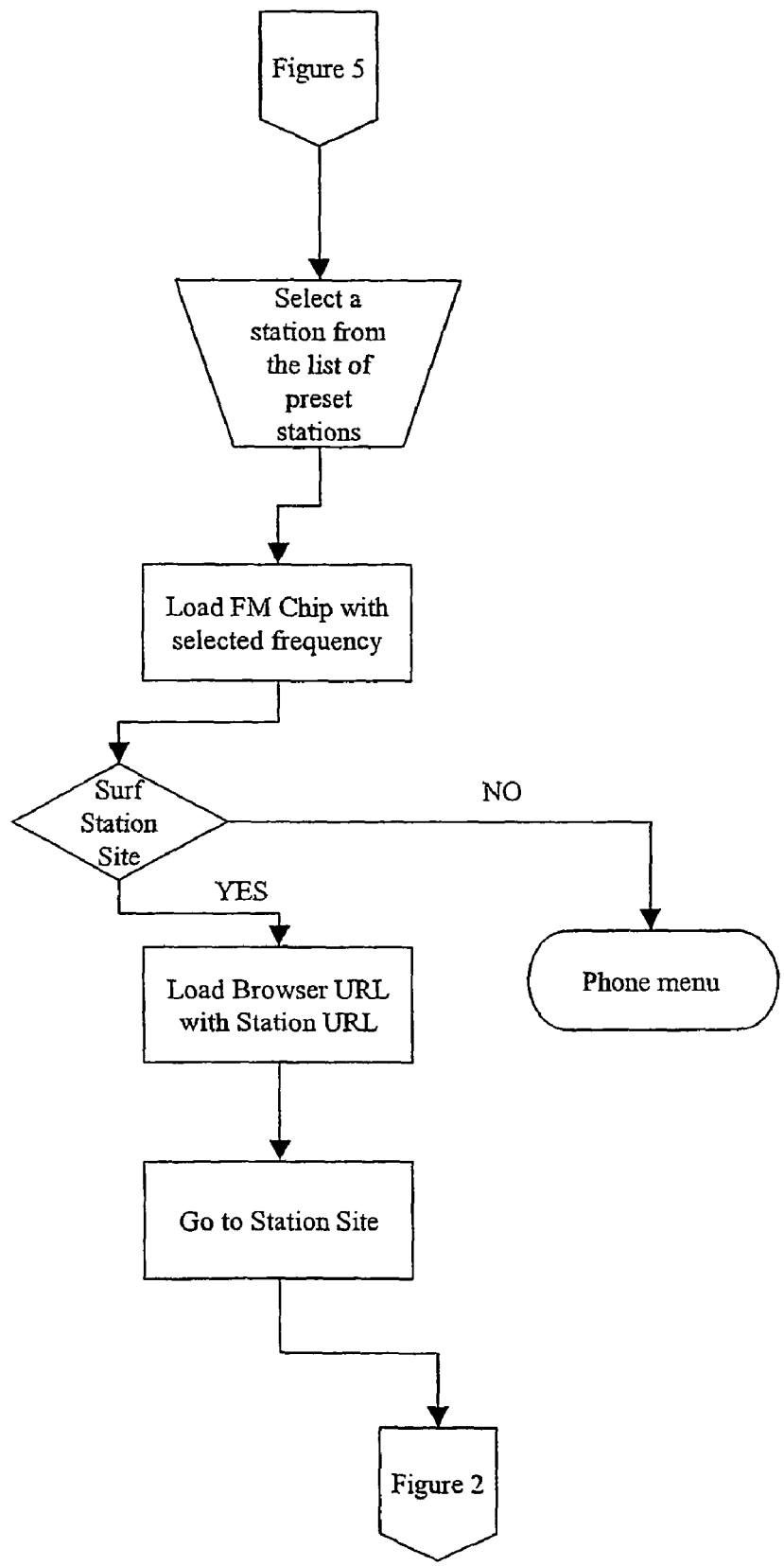
FIG. 5 is a flow chart illustrating a method for setting the broadcast receiver frequency and browser settings based on saved bookmarks.

FIG. 5 is a flow chart illustrating a method for setting the broadcast receiver's frequency and making browser settings based on saved bookmarks. In this embodiment, frequency is downloaded first and the related URL information is loaded based on that frequency information.

Figure 6:
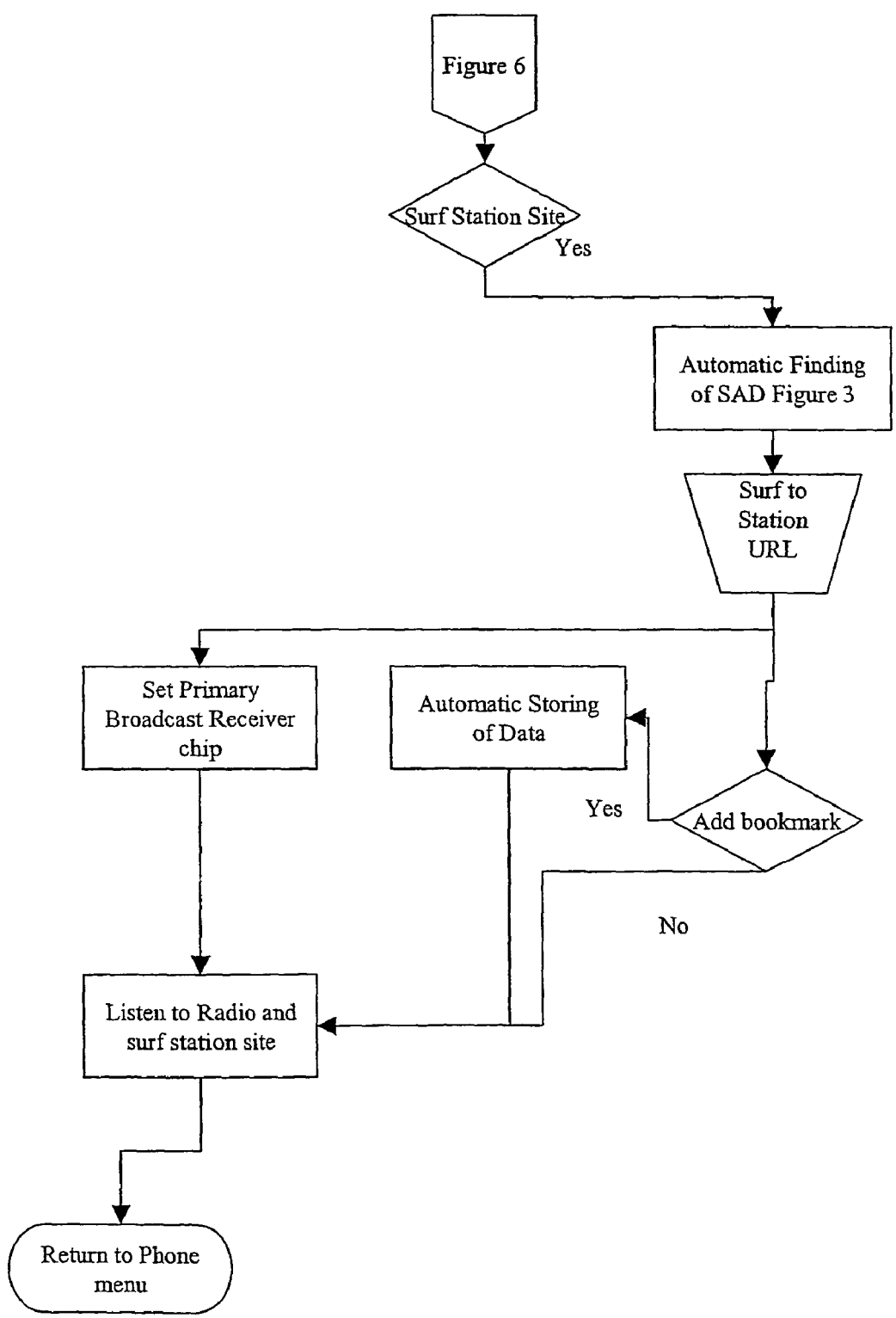
FIG. 6 is a flow chart illustrating a combined selection of broadcast receiver and a browser URL (Uniform Resource Locator).
Figure 1:
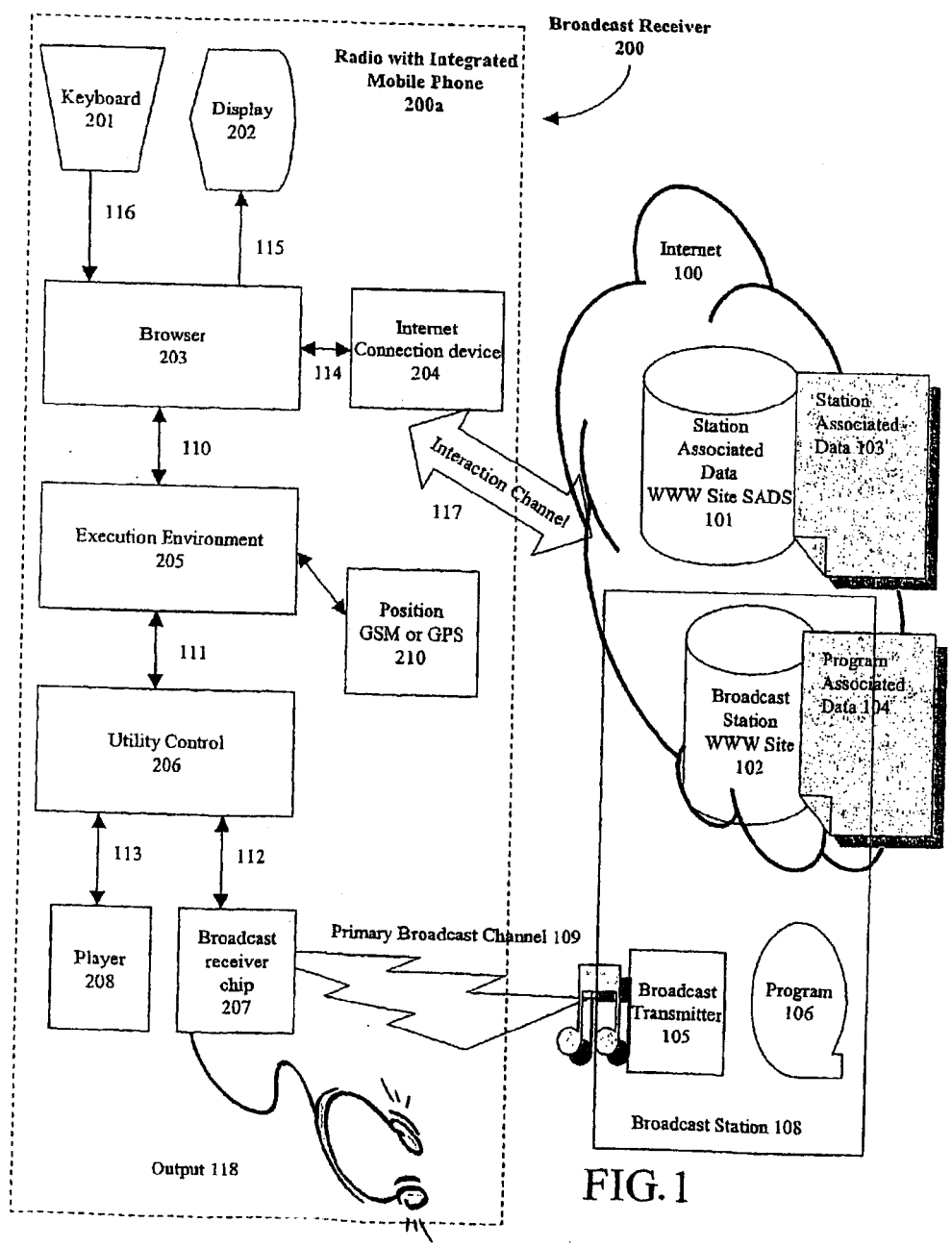
Figure 2:
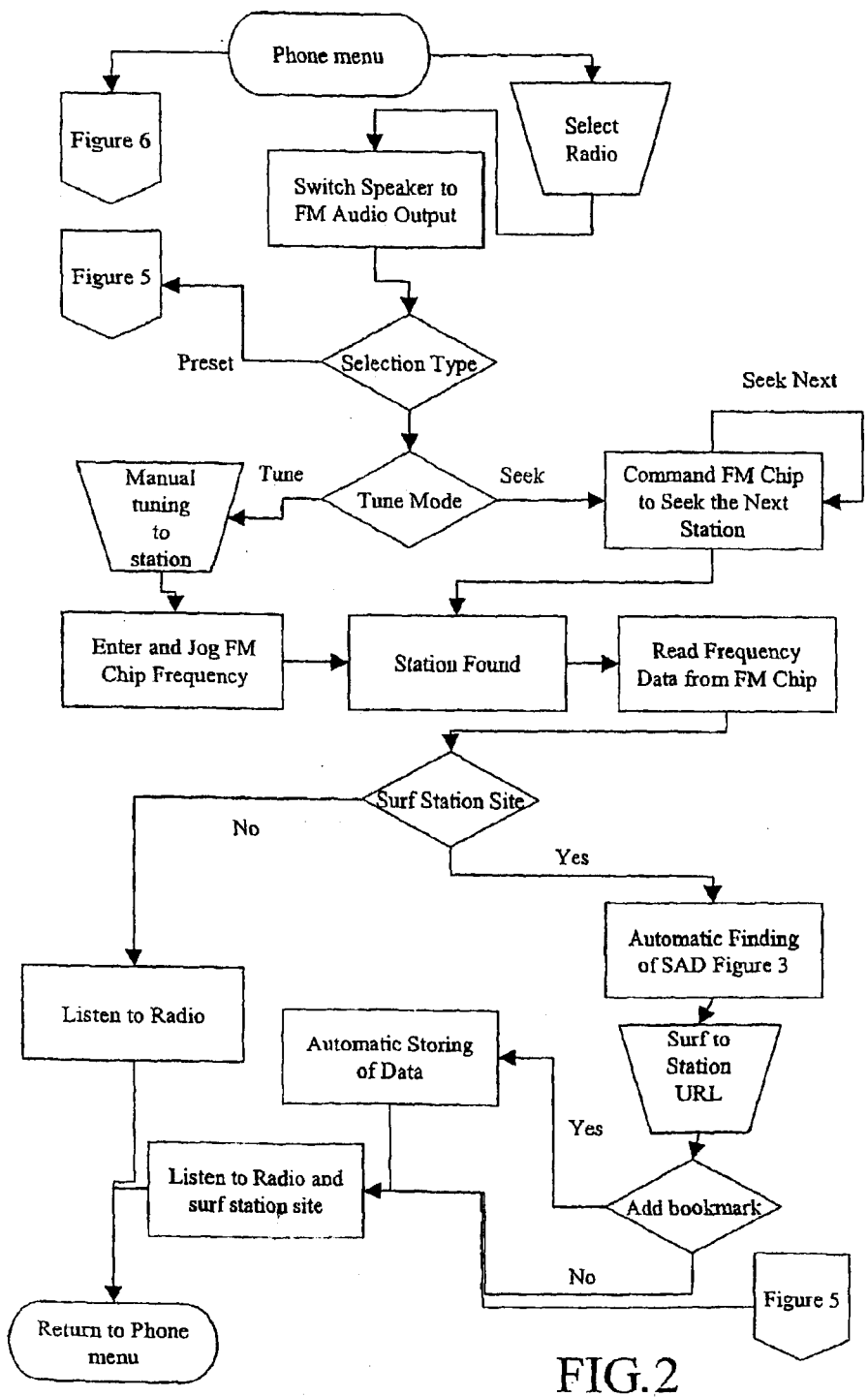
Figure 3:
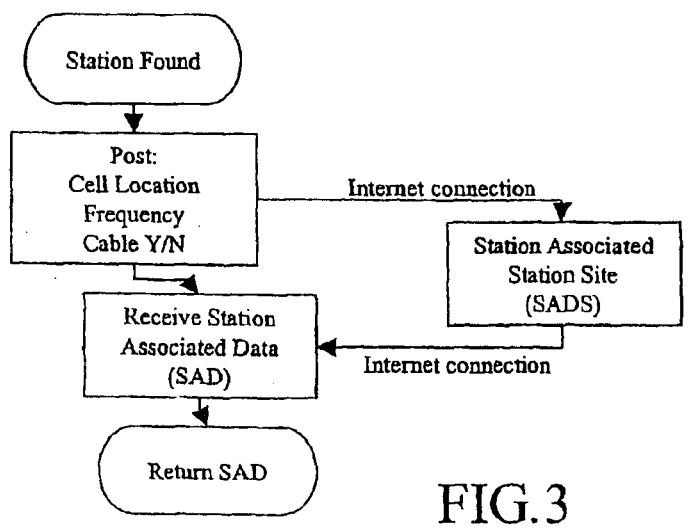
Figure 4:
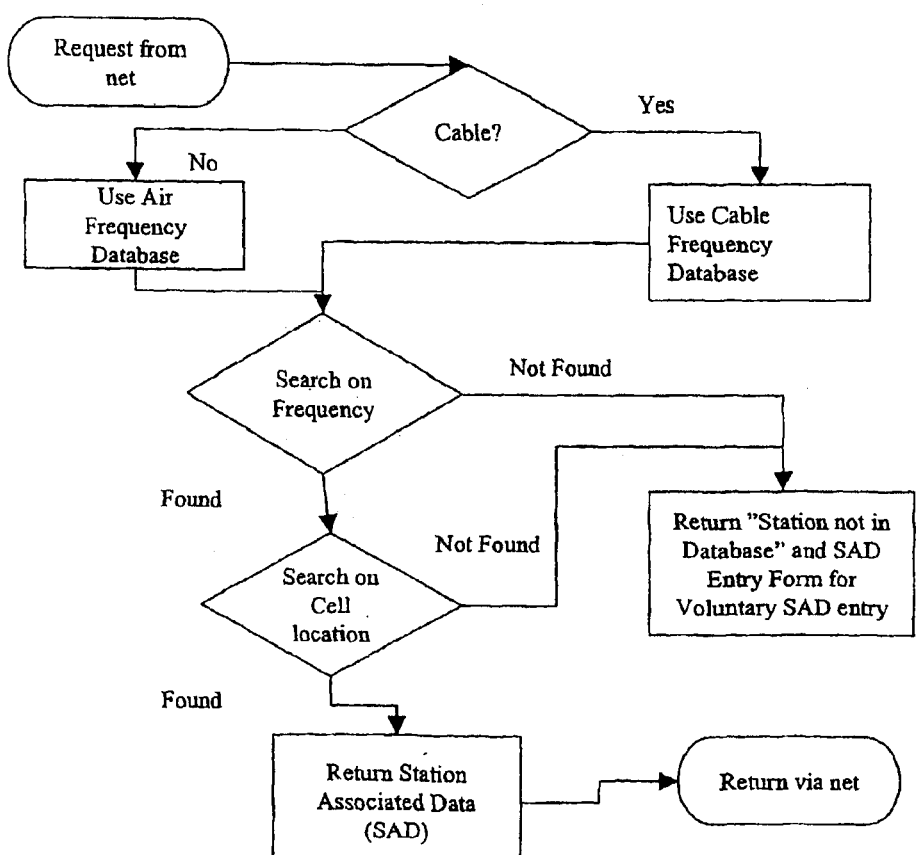
Figure 5:
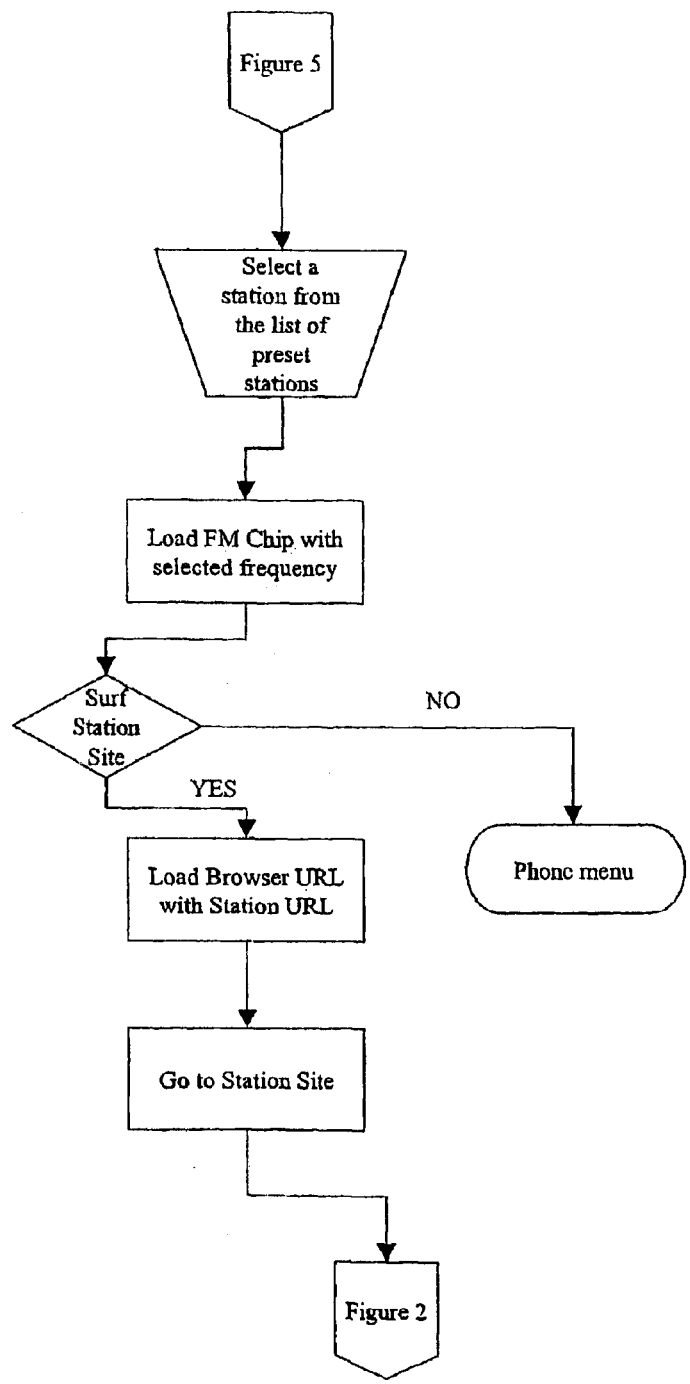
Figure 6:
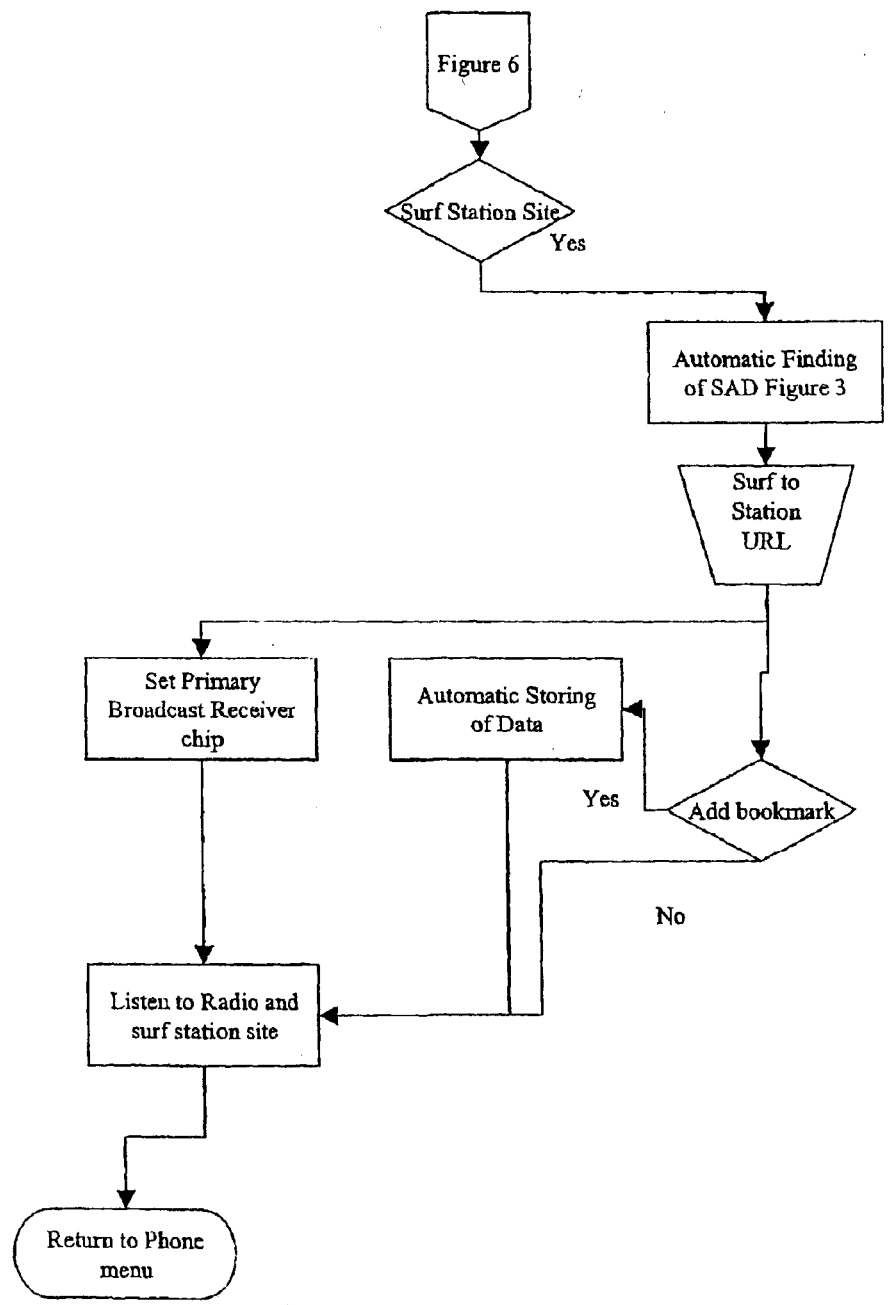

FIG. 6 is a flow chart illustrating a combined selection of a broadcast receiver and a browser URL (Uniform Resource Locator). In this embodiment the URL of the station site and the settings of the broadcast receiver are set with a single selection act. Both the URL of PAD and the frequency of the broadcast receiver chip are set by automatic finding and retrieving of SAD.

Although the invention has been described in the context of a preferred embodiment and applications, it is not limited to these examples but it may vary within the scope of the appended claims.

ABBREVIATIONS AND ACRONYMS

BC=Broadcast Channel
DAB=Digital Audio Broadcasting
GPS=Global Positioning System
HTML=Hypertext Markup Language
HTTP=Hypertext Transfer Protocol
IMSI=International Mobile Subscriber Identity
URL=Unified Resource Locator
SAD=Station Associated Data
SADS=Station Associated Data Site
SMS=Short Message
PAD=Program Associated Data
WAP=Wireless Application Protocol
UML=Wireless Markup Language
WTAI=Wireless Telephony Application

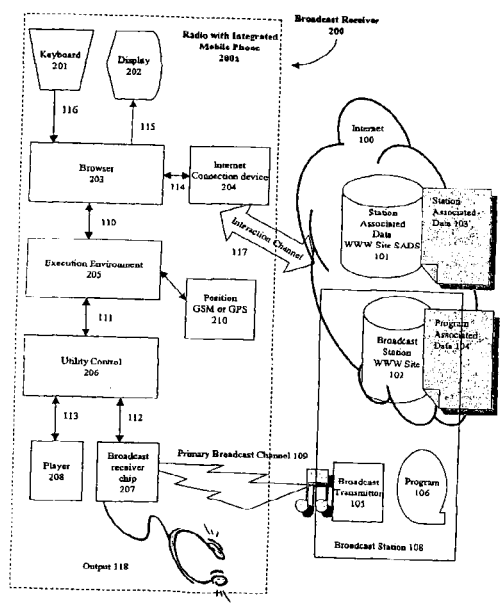

The invention claimed is:

1. An apparatus, comprising:
at least one processor; and
at least one memory including computer program code for one or more programs, the at least one memory and the computer program code configured to, with the at least one processor, cause the apparatus to perform at least the following:
receive, via a broadcast receiver, a primary broadcast using a primary broadcast channel;
access, via a data network connection device, a data network with a hypertext retrieval protocol; and
process, via a browser, in communication with the data network connection device, hypertext on a display of the broadcast receiver;
wherein said broadcast receiver comprises a utility control interface configured to:
read, from station associated data retrieved from a station associated data site by the browser,
broadcast station settings and a uniform resource locator of program associated data related to the broadcast station settings; and
control the broadcast receiver based on the broadcast station settings and the uniform resource locator.

2. The apparatus of claim 1, wherein the broadcast station settings or the uniform resource locator are available to the broadcast receiver at a current position of the broadcast receiver.

3. The apparatus of claim 1, wherein the broadcast receiver unit is a radio unit.

4. The apparatus of claim 1, wherein the broadcast receiver unit is a television receiver unit.

5. The apparatus of claim 1, wherein the browser is configured to retrieve the uniform resource locator based on a frequency selection made at the broadcast receiver.

6. The apparatus of claim 1, wherein the browser is configured to retrieve the uniform resource locator based on a position of the broadcast receiver.

7. The apparatus of claim 6, wherein the position of the broadcast receiver is determined by interacting with a mobile network.

8. The apparatus of claim 6, wherein the position of the broadcast receiver determined by interacting with a global positioning system (GPS) device integrated in the broadcast receiver.

9. The apparatus of claim 1, wherein a combined selection of control settings of the broadcast receiver unit and a uniform resource locator setting for the browser for retrieving the uniform resource locator of the program associated data is based on a single selection of a uniform resource locator link.

10. The apparatus of claim 9, wherein the selection of the uniform resource locator settings for the browser is based on a bookmark stored in browser.

11. The apparatus of claim 1, wherein a connection between the browser and the broadcast receiver is a short-range radio connection.

12. The apparatus of claim 11, wherein the short-range radio connection is a Bluetooth connection.

13. The apparatus of claim 1, wherein a connection between the browser and broadcast receiver is a cable connection.

14. The apparatus of claim 1, wherein a connection between the browser and the broadcast receiver is an infrared connection.

15. A method, comprising:
   receiving station associated data at a data network connection device;
   sending the received station associated data to a browser configured to process hypertext on a display of a broadcast receiver;
   retrieving broadcast station settings from the station associated data;
   retrieving a uniform resource locator of program associated data from the station associated data; and
   controlling the broadcast receiver based on the broadcast station settings and the uniform resource locator.

16. The method of claim 15 wherein the broadcast station settings and the uniform resource locator are available to the broadcast receiver at a current position of the broadcast receiver.

17. The method of claim 15, wherein retrieving the uniform resource locator includes retrieving the uniform resource locator based on a frequency selection made at the broadcast receiver.

18. The method of claim 15, wherein retrieving the uniform resource locator includes retrieving the uniform resource locator based on a position of the broadcast receiver.

19. The method of claim 18, wherein the position of the broadcast receiver is determined by interacting with a mobile network.

20. The method of claim 18, wherein the position of the broadcast receiver is determined by interacting with a global positioning system (GPS)device integrated in the broadcast receiver.

21. The method of claim 15, further comprising, selecting control settings of the broadcast receiver unit and a uniform resource locator setting for the browser based on a single selection of a uniform resource locator link.

22. The method of claim 21, wherein selecting control settings includes selecting the uniform resource locator setting for the browser based on a bookmark stored in the browser.

* * * * *

UNITED STATES PATENT AND TRADEMARK OFFICE
CERTIFICATE OF CORRECTION

| | | |
|---|---|---|
| PATENT NO. | : 8,254,863 B2 | Page 1 of 7 |
| APPLICATION NO. | : 10/509376 | |
| DATED | : August 28, 2012 | |
| INVENTOR(S) | : Stefan Strandberg et al. | |

It is certified that error appears in the above-identified patent and that said Letters Patent is hereby corrected as shown below:

The title page should be deleted to appear as per attached title page.

The sheet of drawings consisting of Figures, 1-6 should be deleted to appear as per attached figures 1-6.

In Column 3, Line 17, delete "channel." and insert -- channel; --, therefor.

In Column 4, Line 48, delete "it" and insert -- its --, therefor.

Signed and Sealed this
Twelfth Day of February, 2013

Teresa Stanek Rea
*Acting Director of the United States Patent and Trademark Office*

(12) United States Patent
Strandberg et al.

(10) Patent No.: US 8,254,863 B2
(45) Date of Patent: Aug. 28, 2012

(54) BROADCAST RECEIVER AND METHOD FOR SETTING BROADCAST RECEIVERS

(75) Inventors: Stefan Strandberg, Vörå (FI); Johan Sjöblom, Vörå (FI)

(73) Assignee: Manor Research, L.L.C., Dover, DE (US)

(*) Notice: Subject to any disclaimer, the term of this patent is extended or adjusted under 35 U.S.C. 154(b) by 1914 days.

(21) Appl. No.: 10/509,376

(22) PCT Filed: Mar. 27, 2003

(86) PCT No.: PCT/FI03/00237
§ 371 (c)(1),
(2), (4) Date: Sep. 28, 2004

(87) PCT Pub. No.: WO03/084098
PCT Pub. Date: Oct. 9, 2003

(65) Prior Publication Data
US 2005/0170799 A1 Aug. 4, 2005

(30) Foreign Application Priority Data
Mar. 28, 2002 (FI) .................. 20020613

(51) Int. Cl.
H04B 1/18 (2006.01)
(52) U.S. Cl. ......... 455/179.1; 455/186.1; 455/185.1; 455/186.1, 455/3.02
(58) Field of Classification Search ............ 455/186.1, 455/3.01, 3.02, 3.06, 414.1 414.3, 142, 344, 455/188.1, 553.1, 552.1, 550.1, 403, 500, 455/517, 466, 73–74, 556.1, 185.1, 180.1, 455/184.1, 158.4, 426.1 427, 12.1, 557, 455/130, 179.1; 348/E7.071; 709/217, 231, 709/223, 219, 232

See application file for complete search history.

(56) References Cited

FOREIGN PATENT DOCUMENTS
| EP | 0 848 553 A2 | 6/1998 |
| EP | 1 187 474 A2 | 3/2002 |
| EP | 1 191 722 A2 | 3/2002 |
| WO | 03084098 | 9/2003 |

OTHER PUBLICATIONS

European Office action for corresponding EP app. No. 03 712 172.0-2411 dated Aug. 2, 2010, pp. 1-4.
Swedish Patent Office, International Search Report PCT/FI03/00237; Jun. 5, 2003; 2 pages.

*Primary Examiner* — Pablo Tran
(74) *Attorney, Agent, or Firm* — Stolowitz Ford Cowger LLP

(57) ABSTRACT

A broadcast receiver and a method for setting the broadcast receiver, comprising receiving a primary broadcast sent by a broadcast station and retrieving program associated data made available by said broadcast station. The method comprises a first channel, a primary broadcast channel BC, and a second channel, an interaction channel, for retrieving the program associated data (PAD) from the broadcast station, whereby a browser sends an HTTP or a WAP request using an Internet connection. The method comprises retrieving a uniform resource locator of the program associated data (PAD) as station associated data (SAD) from a station associated data site (SADS) the station associated data comprising program associated data relating to the primary broadcast, coverage information and frequency information of included broadcast stations and the broadcast receiver being capable of setting the browser and the broadcast receiver unit by suing this SAD information.

22 Claims, 5 Drawing Sheets